(No Model.)
J. SCULLY.
CONICAL BOILER TUBE EXPANDER.
No. 290,273. Patented Dec. 18, 1883.
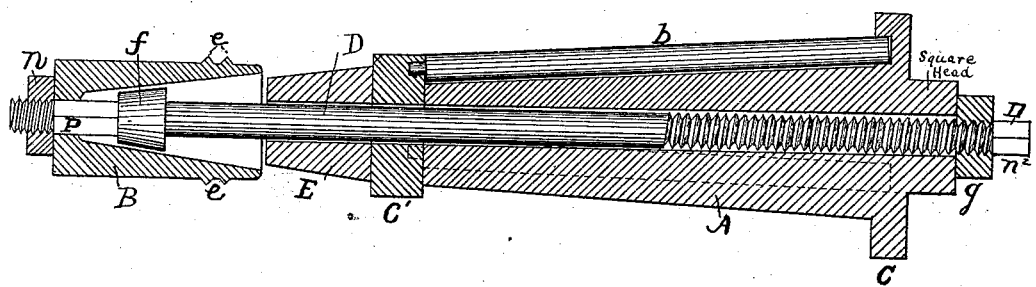
Witnesses.
John M{c} Card
Daniel P. Marcy
Inventor.
James Scully

UNITED STATES PATENT OFFICE.

JAMES SCULLY, OF NEW ORLEANS, LOUISIANA.

CONICAL BOILER-TUBE EXPANDER.

SPECIFICATION forming part of Letters Patent No. 290,273, dated December 18, 1883.

Application filed July 9, 1883. (No model.)

*To all whom it may concern:*

Be it known that I, JAMES SCULLY, of New Orleans, in the parish of Orleans and State of Louisiana, have invented a new Conical Boiler-Tube Expander, wherein I use a cone-cylinder having rollers and a gripping-thimble, the combined operation of which is adapted to expanding boiler-tubes and making same secure in boiler-heads; and I do hereby declare that the following is a full and exact description thereof, reference being had to the annexed drawings, making a part of this specification, in which drawings—

Figure 1 is a longitudinal section view of my boiler-tube expander. Fig. 2 represents a perspective view of the gripping-thimble; and Fig. 3 represents the gripping-rod, which is threaded part of its length.

Similar letters of reference indicate similar parts.

Referring to the drawings, the conical expander A has a hole passing through its center. On the outside of the expander A are three or more parallel grooves in the direction of its length and at equal distances apart. The expanding-rollers $b$ lie in these grooves to the depth of about half their diameter, and are permitted to revolve freely therein. The ends of the rollers $b$ are pivoted in the shoulder C and collar C' of the expander A. The gripping-thimble B has three or more longitudinal slits, $s$, commencing at the mouth of the thimble and terminating near its base, in which is a square hole, $h$, for the threaded gripping-rod D to pass through, and near the mouth of the gripping-thimble B, and on the outside of it, are the gripping-edges $e$. The gripping-thimble expander E is cone shape, and has a round hole in its center for the threaded gripping-rod D to pass through, on which it works freely. This cone is caused to enter the thimble B for the purpose of expanding the latter and causing it to take a hold or grip on the inside of the tube. The threaded gripping-rod D is squared at P, to fit the square hole in gripping-thimble B, and is provided with shoulder $f$, to prevent the thimble from slipping off from it. The nut $n$ is for the same purpose. A square, $n^2$, is provided on the end of gripping-rod D, and a nut, $g$, which screws on the screw of gripping-rod D. The square $n^2$ is on the rod D for the purpose of holding said rod by a wrench while the nut $g$ is screwed on the rod, said nut pressing against the end of expander A, causing the gripping-rod D to draw the thimble B on the expander E, to cause the thimble to spread and grip the inner surface of tube.

The operation of the expander is as follows: The gripping-thimble B is inserted into the tube to be expanded, and the end of the tube rests at some point on the conical expander A. Then, by operating the nut $g$ on the threaded gripping-rod D, the thimble B is drawn up on the cone E which enters the thimble, causing it to expand, fit, and take firm hold on the inside of the tube, the point at which the end of the tube rests on the expander A acting as a purchase to perform the operation, a firm hold having been secured by the thimble B on the tube. The expander A is turned round (not screwed up) after the whole of the expander is inserted, and the gripping arrangement is firmly secured in its place by applying a wrench on the square on the end of the expander A at shoulder C, the expander A being inserted and secured by gripping B in the tube, as before described.

The turning of expander A causes the rollers $b$ to press the ends of tube outward, flanging them, to a certain extent, in the heads of the boiler, and when this has been completed the gripping-thimble B is loosened and the tool is inserted a little farther and the fastening and turning operation of expander repeated until the proper flange is secured.

Having described my invention, what I claim as new, and for which I desire Letters Patent, is—

1. The combination of the conical expander A, having rollers $b$, the gripping-thimble B, the thimble-expander E, with means for operating the same, and the gripping-rod D, having shoulder $f$, as and for the purpose herein shown and described.

2. The combination of the expander A, rollers $b$, thimble B, thimble-expander E, threaded gripping-rod D, and nut $g$, substantially as and for the purpose herein shown and described.

JAMES SCULLY.

Witnesses:
MARTIN MCMAHON,
JAMES LUSTED.